Patented July 2, 1935

2,007,013

UNITED STATES PATENT OFFICE 2,007,013

MANUFACTURE OF SALOL

Michael N. Dvornikoff, St. Louis, Mo., assignor to Monsanto Chemical Company, St. Louis, Mo., a corporation of Delaware No Drawing. Application April 13, 1934, Serial No. 720,434

2 Claims. (Cl. 260—104)

This invention relates to the manufacture of salol (phenyl ester of salicylic acid) and it has as its object a new method of producing a readily purifiable product in good yields.

Heretofore salol has been made either by heating salicylic acid under conditions whereby carbon dioxide is evolved or by condensing salicylic acid with phenol in the presence of a condensing agent such as phosphorous oxychloride. These methods, however, share the objection of relatively poor yield and especially of an inferior resulting product which is difficult and expensive to purify.

It has been proposed to form salicyl chloride by reacting sodium salicylate with paratoluenesulphochloride and subsequently combining the salicyl chloride with phenol (German Patent 123,052). Although this method of producing phenyl esters from the acid chloride is generally applicable, in the case of salicylic acid esters it is wholly unsuccessful and no salol is obtained, the allegations in the patent to the contrary notwithstanding.

I have now found that if one causes salicylic acid to react with thionyl chloride in the presence of a trace of aluminum chloride and subsequently mixes the reaction product with phenol, one obtains practically quantitative yields of salol which, upon a single crystallization from alcohol, gives a colorless product in excellent yields having a melting point of 42° C.–43° C.

The following example illustrates an embodiment of my invention:

138 parts of salicylic acid is mixed with 143 parts of thionyl chloride, this being equivalent to 20% excess of that theoretically required to combine with the salicylic acid. A trace of aluminum chloride is added, preferably to the thionyl chloride before the latter is mixed with the salicylic acid. For this purpose .25 grams of aluminum chloride will be found sufficient. The mixture is maintained at approximately 50° C. for 24 hours, during which time the hydrogen chloride and sulphur dioxide are evolved. The residual excess thionyl chloride is removed conveniently by distillation at reduced pressure, care being exercised to avoid raising the temperature of the product substantially above 50° C. The yield of salicyl chloride will be found to be nearly theoretical. If desired this reaction may be effected in the presence of an inert liquid such as benzene, ligroin, etc.

The resulting product is then added dropwise to one mol. of anhydrous phenol while agitating the phenol and maintaining the same at approximately 50° C. HCl is evolved. After all of the salicyl chloride has been added to the phenol the charge is washed once with water which may contain a base to neutralize the residual acidic materials. Thereafter the crude product, which is practically water white, is dissolved in hot alcohol and cooled whereupon salol of inordinate purity (melting at 42° C.–43° C.) is obtained in 75% yield. The mother liquor contains a substantial amount of salol since salol is appreciably soluble in alcohol even at ordinary temperatures. This dissolved material can be recovered and recrystallized by ordinary methods. The total yield of salol is practically theoretical.

Instead of adding the salicyl chloride to anhydrous phenol one may add the same to an aqueous solution of sodium phenate in the same manner while maintaining a temperature not substantially above 20° C. The resulting product is washed with water until neutral and subsequently crystallized from an organic solvent as described above. Other solvents than ethyl alcohol may be employed such as propyl alcohol, petroleum naphtha, etc.

What I claim is:

1. The process of manufacturing a readily purifiable salol in good yields characterized in that salicylic acid is reacted with thionyl chloride in the presence of a trace of aluminum chloride and subsequently causing the reaction product to combine with phenol, the temperature being maintained not substantially in excess of 50° C.

2. The method as defined in claim 1 and further characterized in that the salicylic acid-thionyl chloride reaction product is added to an aqueous alkali solution of phenol at a temperature not substantially in excess of 20° C.

MICHAEL N. DVORNIKOFF.

CERTIFICATE OF CORRECTION.

Patent No. 2,007,013. July 2, 1935.

MICHAEL N. DVORNIKOFF.

It is hereby certified that error appears in the printed specification of the above numbered patent requiring correction as follows: Second column, line 16, for "420" read 42°; and that the said Letters Patent should be read with this correction therein that the same may conform to the record of the case in the Patent Office.

Signed and sealed this 8th day of October, A. D. 1935.

Leslie Frazer (Seal) Acting Commissioner of Patents.